Dec. 2, 1930.  W. N. MOORE  1,783,478
METHOD AND MEANS FOR REMOVING SCALE FROM WATER
JACKETS OF INTERNAL COMBUSTION ENGINES
Filed Oct. 12, 1926
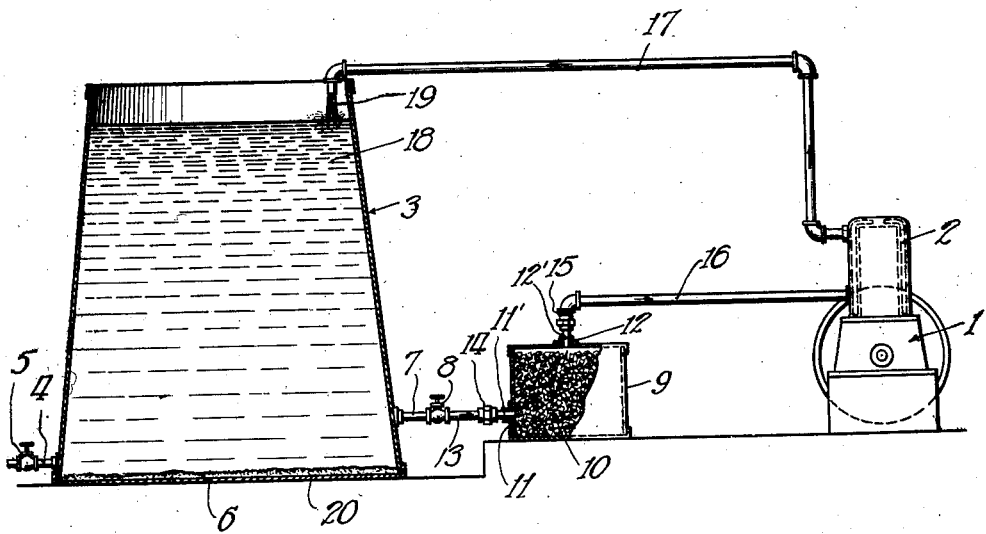
Inventor
Walter N. Moore.

Patented Dec. 2, 1930

1,783,478

UNITED STATES PATENT OFFICE

WALTER N. MOORE, OF KANSAS CITY, MISSOURI, ASSIGNOR TO THREE-M MANUFACTURING COMPANY, OF KANSAS CITY, MISSOURI, A CORPORATION OF MISSOURI

METHOD AND MEANS FOR REMOVING SCALE FROM WATER JACKETS OF INTERNAL-COMBUSTION ENGINES

Application filed October 12, 1926. Serial No. 141,231.

My invention relates to a method of and means for removing scale and similar deposits from water jackets of internal combustion engines.

It is a purpose of my invention to provide a new and improved method of removing scale from the water jacket of an internal combustion engine, comprising the introduction of a reagent, preferably a water softening agent, acting on the scale to dissolve the same, into the circulating cooling medium of the internal combustion engine. This is preferably done by passing the cooling medium through a body of said reagent, so that said reagent goes into solution in the cooling medium, whereupon the cooling medium, charged with said reagent, is passed through the water jacket of the engine, to act on the scale therein.

It is particularly desirable to introduce the reagent, that is to act on the scale, into the cooling system at such a point, that the circulating cooling medium is impregnated with the reagent immediately before it enters the water jacket to act on the scale therein. This causes a very strong solution of the reagent to be brought into contact with the scale, one that is, in fact, when the reagent is first introduced, substantially a saturated solution. It will be understood, however, that, as the reagent solution circulates throughout the cooling system, the same will also act to remove any scale that may have accumulated in the conduits of the system, thereby aiding the free circulation of the cooling medium throughout the system.

It is a further purpose of the invention to provide a new and improved method of removing scale from the water jacket of an internal combustion engine, comprising the repeated circulation of the reagent solution through the water jacket, and through the cooling system comprising, preferably, a reservoir for the cooling agent and a container for a body of the reagent, through which the cooling medium is passed.

It is still another object of the invention to provide a new and improved apparatus for removing scale from the water jacket of an internal combustion engine, comprising a container for a reagent, a reservoir for the cooling medium and means for connecting the reservoir with the container, and the container with the water jacket, in such a manner, that the cooling medium is conducted from the reservoir, through the reagent in the container to the water jacket, and then from said water jacket back to the reservoir. Preferably the conduit leading from the reservoir to the container extends from a point spaced from the bottom of the reservoir to provide a settling space below the outlet to said conduit. Said conduit, preferably, also leads into said container at a lower point than the outlet leading from said container to said water jacket, the inlet and outlet to said container being spaced, so as to provide an upward flow of the cooling medium through the reagent in said container. This is desirable, as it prevents the carrying of undissolved reagent into the comduits.

Other objects and advantages of my invention will appear as the description of the accompanying drawings proceeds. It is to be understood, however, that I do not intend to limit myself to the exact details shown or described, but that I intend to include, as part of my invention, all such obvious changes and modifications of parts as would occur to a person skilled in this art, and as would fall within the scope of the claims.

In the drawings, the figure is a diagrammatic view, partly in elevation and partly in section, of my improved scale removing apparatus.

Referring in detail to the drawings, my improved scale removing apparatus is shown as being applied to the cooling system of an internal combustion engine, said engine being indicated by the numeral 1, and having a water jacket 2. The apparatus further comprises a reservoir 3, for the cooling medium, which is preferably water. The reservoir 3 is preferably provided with a drain outlet 4, having a drain valve 5, said outlet being spaced only a slight distance from the bottom 6 of said reservoir 3. An outlet 7 having, preferably, a valve 8 is also provided for the reservoir 3 located at a slightly higher level than the outlet 4, so as to provide a settling space in the bottom of said reservoir.

A reagent container 9 is also provided, which is, preferably, in the form of a cylindrical drum, and which is filled with reagent material 10, preferably at the factory. The reagent material is preferably finely divided, and may be in any desired form so as to be acted upon in the desired manner by the cooling medium, although it is preferably in a solid form. While the particles are shown relatively large in the drawings, this is done merely for the purpose of illustration, the particles being actually much smaller than shown, and the size thereof being exaggerated in the drawings to more clearly show the same and the movement of the cooling medium therethrough. The drum is, preferably, placed on its side and has an internally threaded inlet 11 at one end thereof, and an internally threaded outlet 12 in the side wall thereof. In setting up the apparatus, the outlet 12 preferably extends upwardly from the top of the tank, so as to locate the same at a higher level than the inlet 11. This is done so as to prevent the cooling medium from washing the reagent material in a solid state into the conduits.

From the valve 8, a conduit 13 extends to a quick-detachable connection, such as the union 14, which connects the conduit 13 with the inlet connection 11, through a suitable nipple 11', and a second union 15 is preferably provided for quick-detachably connecting the outlet connection 12, through the nipple 12' with the conduit 16, leading into the water jacket 2. A conduit 17 also leads from the water jacket 2 to the top of the reservoir 3, to provide a closed cooling circuit, for the cooling medium of the engine 1.

The containers 9 are preferably filled at the factory with the reagent material 10, which is preferably finely divided, and are shipped with the connections 11 and 12 in place. It is obvious, that the container 9 can be readily and quickly inserted in the cooling system of the internal combustion engine, by shutting off the valve 8, manipulating the unions 14 and 15 to release the old container 9, which has been emptied of reagent material, removing the old container 9, replacing the same with the new container 9, and connecting the connections 11 and 12, respectively, of the container filled with the fresh reagent material, by means of the nipples 11' and 12' and the unions 14 and 15 with the proper conduits in the system. The valve 8 can then be opened and the operation of the internal combustion engine resumed, only a few minutes being consumed in making the change from an empty container 9 to a fresh container 9.

In carrying out my improved method of removing the scale from a water jacket of an internal combustion engine, the reservoir 3 is filled with the usual cooling medium 18, preferably water, in the usual manner, or in case the reservoir is already filled with such cooling meduim, this is not disturbed. The container 9 is inserted in the cooling system in the manner set forth above, and the engine 1 is started. Thereupon, the water or other cooling medium is caused to circulate in the cooling system in the usual manner, either due to differences in temperature in the water in various parts of the system, or by suitable well known mechanical means. The water or other cooling medium 18 flows from the reservoir 3 through the outlet 7, and connections 13 and 11 into the container 10, and then percolates through the reagent material 10 toward the outlet connection 12, the direction of flow of the water or other cooling medium in the system being indicated by the arrows in the drawings. From the container 9, the water or other cooling medium, which is charged or impregnated with the reagent material 10, flows through the conduit 16 into the water jacket 2, where it comes in contact with the scale deposited therein, dissolving the same and carrying the dissolved scale, with the cooling medium, through the conduit 17 into the reservoir 3, the cooling medium preferably discharging by gravity into said reservoir, as indicated at 19 in the drawings. Due to the presence of the large body of relatively cooler water or other cooling medium 18 in the reservoir 3, and due to the relatively quiet condition of the contents of the reservoir, the scale forming material tends to settle out, or precipitate in the space below the outlet 7, as indicated at 20 in the drawings. As the quantity of such material 20 increases, the same may be drawn off through the drain valve 5. The cooling medium 18, as it continues to circulate in the system, repeatedly passes through the container 9 in contact with the reagent material 10 until all said material is dissolved, at which time the cooling medium throughout the system is substantially uniformly impregnated with such reagent. As the cooling medium, with the reagent in solution therein, is continuously circulating through the water jacket in contact with the scale deposited therein, the scale is gradually removed. Furthermore, as the reagent is, preferably, a water softening agent, such as tri-sodium phosphate, ($Na_3PO_4$), the scale will not only be removed, but the tendency for more scale to form will be obviated.

Thus the scale can be readily removed without stopping the engine for any appreciable length of time, and without dismantling the same in any manner, as is now necessary, when scale is removed by means of muriatic acid and a tapping operation on the water jacket walls.

Having thus described my invention what

I desire to claim and secure by United States Letters Patent is:

1. A device of the character described, comprising a cooling medium reservoir, a reagent container, means spaced from the bottom of said reservoir for conducting the cooling medium from said reservoir to said container, an internal combustion engine having a water jacket, means for conducting said cooling medium from the upper portion of said container directly into said water jacket to produce an upward flow thereof through said reagent and means for conducting said cooling medium from said water jacket into said reservoir.

2. The method of removing scale from the water jacket of an internal combustion engine, comprising passing relatively cool cooling medium through a body of a finely divided solid reagent, soluble in said cooling medium to provide a concentrated solution of said reagent acting on said scale to dissolve the same, circulating said reagent solution in said water jacket in contact with the scale while said engine is running to heat the reagent solution while in contact with said scale, discharging the reagent solution from said jacket into a relatively large body of relatively cool cooling medium to cool the same and precipitate the scale forming material therein and recirculating said cooling medium in the same manner until all said reagent is dissolved.

3. A method of the character described, comprising the introduction of a body of reagent in solid form, soluble in the cooling medium for an internal combustion engine and acting on the scale in the water jacket thereof to dissolve the same, into the cooling system of said engine; passing the cooling medium through said body of reagent during the normal circulation of said cooling medium to form a concentrated solution of said reagent in said cooling medium and then passing the said solution of said reagent directly into and through the water jacket of said engine into engagement with said scale.

4. The method of removing scale from the water jacket of an internal combustion engine, comprising the introduction of a body of reagent in solid form soluble in the cooling medium for said engine and acting on said scale to dissolve the same, into the cooling system of said engine; passing the cooling medium through the said body of reagent during the normal circulation of said cooling medium to form a concentrated solution of said reagent in said cooling medium; than passing the concentrated solution of said reagent through the water jacket of said engine into engagement with said scale; and conducting the said solution into a large body of said cooling medium to permit the scale forming ingredients in said cooling medium to settle out of the same.

5. The method of removing scale from the water jacket of an internal combustion engine, comprising the circulation of a stream of cooling medium through a body of reagent in solid form, soluble therein and acting on said scale to dissolve the same, from said body of reagent directly into and through said water jacket, from said water jacket into a large body of said cooling medium in a settling basin and repeating said circulation of said cooling medium through said body of reagent until all thereof is dissolved, whereby said scale is first dissolved and the entire body of said cooling medium is gradually impregnated with said reagent.

6. The method of treating the cooling medium of an internal combustion engine to prevent the interference of scale in the water jacket with the cooling action of said medium, comprising the passing of a stream of said cooling medium through a body of water softening agent in solid form and immediately passing the stream of cooling medium charged with said softening agent and constituting a concentrated solution thereof into said water jacket during the normal circulation of said cooling medium.

In testimony whereof, I hereunto subscribe my name this seventh day of October, 1926.

WALTER N. MOORE.